United States Patent [19]

Modell

[11] Patent Number: 4,543,190

[45] Date of Patent: * Sep. 24, 1985

[54] PROCESSING METHODS FOR THE OXIDATION OF ORGANICS IN SUPERCRITICAL WATER

[75] Inventor: Michael Modell, Cambridge, Mass.

[73] Assignee: Modar, Inc., Natick, Mass.

[ * ] Notice: The portion of the term of this patent subsequent to Jul. 6, 1999 has been disclaimed.

[21] Appl. No.: 619,394

[22] Filed: Jun. 11, 1984

Related U.S. Application Data

[63] Continuation of Ser. No. 393,813, Jun. 30, 1982, abandoned, and a continuation-in-part of Ser. No. 147,946, May 6, 1980, Pat. No. 4,338,199.

[51] Int. Cl.[4] .............................................. C02F 1/72
[52] U.S. Cl. .................................... 210/721; 210/761
[58] Field of Search .................. 48/202, 209, 210; 210/721, 723, 761, 762, 766, 774

[56] References Cited

U.S. PATENT DOCUMENTS

| | | |
|---|---|---|
| 2,665,249 | 1/1954 | Zimmermann . |
| 3,207,572 | 9/1965 | Saul .................... 210/761 X |
| 3,442,798 | 5/1974 | Schoeffel . |
| 3,761,409 | 9/1973 | McCoy et al. .................. 210/761 |
| 3,876,497 | 4/1975 | Hoffman .................. 210/761 X |
| 3,920,506 | 11/1975 | Morgan .................. 210/761 X |
| 4,000,068 | 12/1976 | Nelson .................. 210/762 X |
| 4,013,560 | 3/1977 | Pradt .................. 210/761 X |
| 4,113,446 | 12/1978 | Modell . |
| 4,141,829 | 2/1979 | Thiel et al. .................. 210/762 |
| 4,145,283 | 3/1979 | Topp . |
| 4,155,848 | 5/1979 | Sato . |
| 4,174,280 | 11/1979 | Pradt . |
| 4,191,012 | 3/1980 | Stoddard . |
| 4,241,722 | 12/1980 | Dickinson .................. 126/263 |
| 4,284,015 | 8/1981 | Dickinson .................. 110/347 |
| 4,292,953 | 10/1981 | Dickinson .................. 126/263 |
| 4,338,199 | 7/1982 | Modell .................. 210/761 X |

OTHER PUBLICATIONS

Wightman, "Studies in Supercritical Wet Air Oxidation", Master'Thesis, University of California, Berkley, Mar. 1981.

New Waste Disposal Process, Chemical Engineering, Aug. 25, 1958.

Operation of the Zimpro Wet Air Oxidation Unit, Zimpro Technical Bulletin, 1964.

Wet Oxidation Boiler-Incinerator, by Louis A. Pradt, Zimpro Inc., CA 09204027864W.

Wet Air Oxidation, Chemical Engineering Process (vol. 60, No. 1) Jan. 1964.

Report for the Office of Research and Technology, May 9, 1974 by Gerald Fishbeck et al, Univ. of Delaware on the WAO Process (PB0245,266).

Excerpts From Love Canal Proposal by Modar, Inc.

Primary Examiner—Thomas Wyse
Attorney, Agent, or Firm—Kenyon & Kenyon

[57] ABSTRACT

A method of oxidizing an organic material in an oxidizer includes forming a mixture of the organic material with water and a fluid including oxygen under conditions near supercritical pressure. At the inlet of the oxidizer, the mixture is caused to undergo reaction under supercritical conditions for water, characterized by a temperature of at least about 400° C. and a pressure of at least about 220 atmospheres in the oxidizer.

37 Claims, 9 Drawing Figures

THE EFFECT OF FUEL HEATING VALUE ON OXIDIZER OUTLET TEMPERATURE AND RECYCLE RATIO. (FUEL CONC: 10 lb. CH /100 lb. $H_2O$; OPERATING PRESSURE: 3,600 p.s.i.a.; NO HEAT EXCHANGER; OXIDIZER INLET TEMPERATURE: 377° C.)

THE EFFECT OF FEED CONCENTRATION ON OXIDIZER OUTLET TEMPERATURE AND RECYCLE RATIO. (FUEL HEATING VALUE: 12 000 b.t.u./lb. CH; OXIDANT: PURE OXYGEN; OPERATING PRESSURE: 3,600 p.s.i.a.)

PROCESSING METHODS FOR THE OXIDATION OF ORGANICS IN SUPERCRITICAL WATER

This application is a continuation, of application Ser. No. 393,813, filed June 30, 1982, abandoned and a continuation-in-part of my copending U.S. patent application Ser. No. 147,946 filed May 6, 1980, U.S. Pat. No. 4,338,199.

BACKGROUND OF THE INVENTION

The oxidation of organic materials to carbon dioxide and water is a process known almost since the beginning of time and often used to dispose of waste materials and/or generate useful energy such as steam for heating, power generation and in some cases, for desalination of seawater. In conventional generation of energy in the form of steam often organic fuels are oxidized rapidly in combustion to produce heat which is then transferred through a heat exchanger to a fluid such as water. There are inherent losses in this conventional system. For example, often 10 to 15% of the heating value of the fuel is necessarily lost in the exhaust stack of conventional boilers. In addition, the heat exchangers necessarily add to cost and expense and are often of relatively large size. Heat transfer through surfaces of heat exchangers sometimes causes problems and often requires the use of specialized materials when high temperatures are involved. Hot spots due to salt deposition on boiler tubes can cause expensive down-time due to rupture of tube walls. On the flame or hot gas sides of the tubes, ash or other deposits often impede heat flow and reduce heat transfer efficiency.

In one known process for treating waste organic materials, i.e., the wet air oxidation process, an organic feed and oxidizing agent are pressurized to reaction conditions of from about 1500 to 2500 psia, heated to operating temperature and fed to a reactor for residence times of 0.5 to 1 hour. This process is known to be effective for removing 70–95% of the initial organic material. This system is effective but has certain disadvantages. It is often costly in that large size equipment is necessary and inefficient recovery of the heat of combustion is obtained. Often the solubility of oxygen or air in water is below the level required for complete oxidation of the organic materials. Thus, a two-phase water-gas mixture is often used in the reactor, necessitating provisions for agitation in the reactor so as to avoid excessive mass transfer resistance between the phases. This tends to make the reactor somewhat complicated and more expensive than would otherwise be necessary. Often volatile organics such as acetic acid remain after complete processing. Long residence times are needed and the reactions are often not adiabatic which results in loss of part of the heat of combustion to the environment. When energy is recovered in the form of steam, the temperature of the steam produced is below that of the reactor effluent, which is usually below 300° C. and typically in the range of 250° C. Thus, the heat recovered is of a low to moderate value and significantly below that required for generating electrical power in modern steam cycle power plants.

It has been suggested to recover heat energy from supercritical water effluent and the technology for doing this is highly developed. Electrical utilities since the 50's have used supercritical water power cycles to generate power from fossil fuels.

The known literature describes production of supercritical water by burning fossil fuels followed by the use of equipment for recovering heat from the supercritical water and turning the heat into power. Thus, such recovery systems are known. Rankine cycle type equipment can be used to recover useful energy from water at supercritical conditions and temperatures above 450° C. as known in the art.

It has been suggested that toxic organic materials can be reformed at the supercritical conditions of water to harmless lower molecular weight materials by breakdown of organic chains and the like whereby the resulting non-toxic materials can be disposed.

SUMMARY OF THE INVENTION

It is an object of this invention to provide a method of oxidizing organic materials to obtain useful energy and/or detoxify or destroy noxious and toxic organic materials and/or remove unwanted salts from water.

It is another object of this invention to provide a method in accordance with the preceding object which enables oxidizing of conventional and unconventional organic fuels efficiently with maximized energy recovery in simplified apparatus for use in a wide variety of heating and power cycles.

It is another object of this invention to provide means and methods for rendering harmless and/or easily disposable, waste and/or toxic organic materials where the energy of oxidation thereof can be harnessed to carry out the processing and in some cases useful excess energy is produced.

It is still another object to provide a method in accordance with the preceding objects which can be used to desalinate seawater and brine using the energy of the organic material and in some cases while obtaining additional useful energy and/or treating waste or toxic materials.

It is another object of this invention to provide a method for precipitating inorganic salts from the effluent of the oxidized organic materials wherein the effluent is at supercritical conditions for water.

It is a further object of the invention to provide a method for the reforming of organic materials to provide useful gaseous and liquid fuels.

It is still another object of this invention to provide methods in accordance with the preceding methods which can be carried out in simplified equipment at high reaction rates.

It is still another object of this invention to provide apparatus for carrying out the methods of this invention.

According to the invention organic materials are oxidized in an oxidizer by forming a reaction mixture of the organic materials, water and oxygen with the reaction mixture preferably at supercritical conditions. The mixture is reacted in a single fluid phase in a well-insulated reactor to cause the organic material to be oxidized whereby the effluent stream picks up the heat generated. The organic material can be waste and/or toxic material which are merely oxidized and destroyed in the method. The organic material can be a waste, toxic material or other organic material useful as a fuel and is oxidized to recover useful energy for heating or to obtain a mixture of supercritical water and carbon dioxide suitable for use as process water in power cycles, or other applications, such as injection into oil wells to enhance recovery.

In another preferred method, the organic material can be any organic material having sufficient heat value to raise the temperature in an oxidizer at supercritical conditions to a value of at least 450° C. The water contains a salt such as sodium chloride when the water is seawater or brine and the salt precipitates out of the single fluid phase solution immediately after reaction to enable desalting of the water in a rapid and continuous process in conventional precipitating equipment. The effluent from the oxidizer may be treated to form a salt from the oxidation products of the organic material. For example, the halide ion from the oxidation of a halogenated hydrocarbon may be treated with a metal cation to precipitate an inorganic salt.

Preferably a part of the heated water obtained which is preferably at supercritical conditions is mixed directly with the reactants which enter the oxidizer to quickly bring the reaction mixture to the desired temperature for starting the oxidation. The heated water obtained can also be used to provide heat to the reaction mixture through a heat exchange wall surface. Direct mixing is preferred since it enables reaching the desired hot temperatures rapidly, i.e., substantially instantaneously and thus avoids char formation in certain embodiments.

Preferably the organic material is used in an amount of from 2 to 25% by weight of the water at a temperature of 374° C. or above and a pressure of at least 3200 psia. Oxygen is used in the form of pure oxygen, air or other gaseous mixture but in an amount preferably equal to or greater than the stoichiometric amount required for full oxidation of the organic material. The vessel used as an oxidizer is preferably well insulated and of sufficient length to provide sufficient time for essentially complete oxidation of the organics which is preferably designed to occur in about five minutes or less.

A further aspect of this invention involves treating organic materials, such as forest products, pulping wastes, residual oil, coal, or animal excrement or waste products, to form liquid and gaseous fuels and/or intermediate organic chemicals. In this process complex organic structures are broken down to lower molecular weight organics and combustible gases, without the formation of char or coke. This process takes place under elevated temperatures (generally 377° C. to 450° or higher) and high pressures (above 200 atmospheres) using supercritical water as a solvent and optionally a reforming agent. The amount of oxygen used is less than that which would completely oxidize the organic feed material. The high solvent power of supercritical water keeps organic intermediates well solvated and dispersed, thereby eliminating the tendency for char-forming polymerization.

It is a feature of this invention that substantially complete oxidation of organics using supercritical water can be carried out at high speed in relatively uncomplicated equipment. At supercritical water conditions, oxygen and nitrogen should be completely miscible with water in all proportions [see, e.g., H.A. Pray, et al., Ind. Eng. Chem., 44(5), 1146–51 (1952).]. Thus, two-phase flow of gases and water are eliminated and single fluid phase flow results which allows simplification of the reactor construction often without the need for mechanical mixing. When the feed is at 374° C. prior to the onset of oxidation, the heat released by oxidation elevates the temperature of the water-organic-oxygen stream appreciably and it can easily reach 450°–700° C. If the mean temperature in the oxidizer is 400° C. or above, the residence time in the oxidizer can be less than 5 minutes.

At oxidizer temperatures of 500° C. and greater, the residence times are often reduced to one minute and less. At these temperatures, destruction of more than 99.9% of the organic materials can be achieved. Even higher destruction efficiencies have been obtained, such as 99.99%, particularly at temperatures about 600° C. and higher.

Since the oxidation occurs within a water phase, dirty fuels can be used without the need for off gas scrubbing. For example, sulfur in the fuels can be oxidized to solid sulfate which would be readily recovered from the effluent stream from the oxidizer. It is part of the invention to precipitate inorganics in the feed as from a waste slurry, since the solubility of inorganic salts in supercritical water drops to very low levels, as for example 1 ppb to 100 ppm above 450°–500° C. The effluent from the oxidizer can easily be designed to be above 450°–500° C. thus causing inorganics in the stream to precipitate and be readily removed as by cyclones, settling columns or filters. Thus, the water output from the system is purified of inorganic salts. In addition, the feed water need not be purified prior to use, allowing the use of brine or seawater without prior treatment. Thus, the system is ideal for shipboard use where power and/or desalted water can be obtained, sometimes simultaneously. The heat of oxidation of the organics in the feed is recovered directly in the form of high temperature, high pressure water, that is, superheated supercritical water or steam without the need for heat transfer surfaces.

BRIEF DESCRIPTION OF THE DRAWINGS

The above and other objects, features and advantages of the present invention will be better understood from a reading of the following specification in conjunction with the attached drawings in which.

BRIEF DESCRIPTION OF THE PREFERRED EMBODIMENTS

Figure 1:
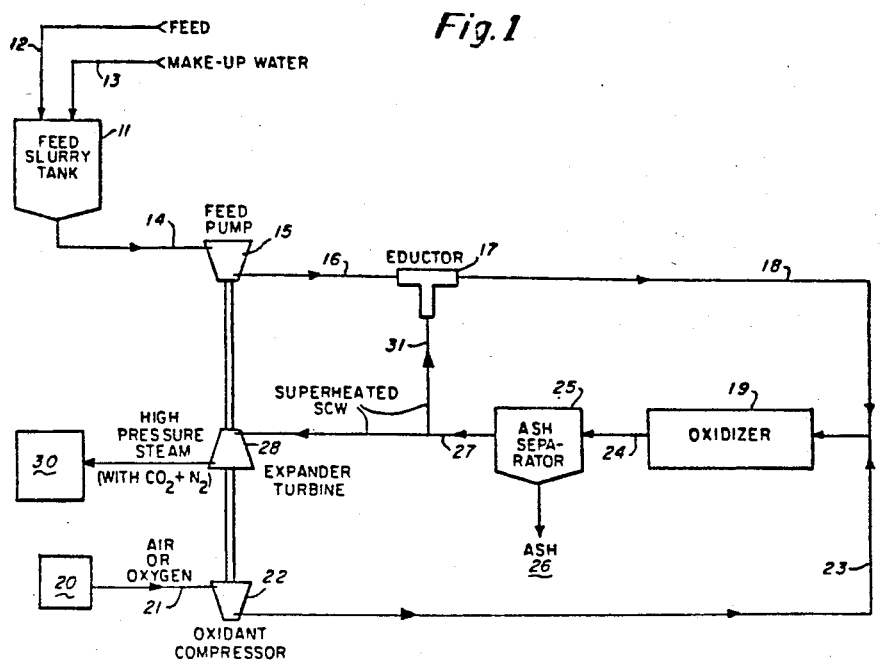
FIG. 1 is a schematic diagram of an apparatus useful for carrying out the process of the present invention.

With reference now to FIG. 1 of the drawing, a schematic diagram of an apparatus for carrying out the method of this invention is shown. The organic material feed is added to feed slurry tank 11 through line 12 along with makeup water passed through line 13.

From the slurry tank, the water and organic materials are passed through line 14, feed pump 15, line 16 to an eductor 17 and line 18 into an oxidizer 19. Air or oxygen from a source 20 passes through line 21 and an oxidant compressor 22 through line 23 either directly to the oxidizer or to line 18 intermixing with the organic material and makeup water to form a reaction mixture entering the oxidizer. After the reaction in the oxidizer, an effluent stream from the oxidizer passes through line 24 to a conventional ash separator 25 where ash and inorganic salts can be removed at the bottom 26 as known in the art with the effluent stream passing through line 27 to an expander turbine 28 and out as useful energy in the form of high pressure steam or water in output 30. A portion of the effluent stream containing carbon dioxide, nitrogen if air is used as the oxidant and supercritical water at superheated temperature that is, above the critical temperature of water 374° C. can be recycled and passed through line 31 and the eductor 17 to give the required degree of heat to the entering reaction mixture at the oxidizer.

The superheated supercritical water in line 27 is passed for recycling to provide the heat necessary at the starting point in the oxidizer or through the expander turbine to form the high pressure steam useful in a conventional power cycle such as 30. Diagrammatic box 30 represents a heat user component. This can be a heat exchanger where the process heat generated is used for space heating or for obtaining useful energy in any known conversion apparatus.

The oxidizer allows single phase reaction which is extremely important to minimize the cost, expense and complexity of the oxidizer itself and maximize rapid reaction in time periods of less than one to 5 minutes.

The supercritical water process of this invention for generating high pressure steam has several advantages over conventional processes that are used for the same purpose. The feed organic material even if wet forest products, can be used directly without drying because water is used as the carrier fluid for both oxidation and reforming when reforming is first carried out. Oxidation takes place rapidly and yet under safe, controlled conditions. Auxiliary equipment for pollution control is not necessary because the oxidation products are maintained within a closed continuous system. Supercritical steam can be generated without the problems associated with heat transfer through surfaces thus minimizing costs and equipment failures. High thermodynamic efficiencies can be obtained with supercritical steam since there is no stack heat loss.

Because a homogeneous single phase mixture of organics, oxidant and water is used, complete oxidation of the organics is facilitated and simplified reactors can be used. A simple tube, or fluidized bed can be used which contain no moving parts. Oxidation catalysts if used, can be those of common metal oxide or supported metal catalysts which provide sufficient activity for oxidation such as $Fe_3O_4$, $MnO_2$ and $CuO$, $NiO$, $Al_2O_3$, $Cu_3O_4$, $AgO$, $Pt$ or $Pd$. In some cases, inorganic components of the feed which are normally present in water from artificial sources such as the sea or inorganic components of fossil fuels or wood products provide sufficient catalytic activity for rapid reactions. The oxidation process is so fast that the reactor often approaches adiabatic operation, that is, heat losses from the oxidizer are negligible and the oxidizer effluent contains essentially all of the enthalpy of oxidation. Thus, the outlet temperature of the oxidizer is determined by the concentration of the organics in the feed and their heating value.

The organic material useful as the feed of the present invention can be substantially any organic materials including fuels and waste shown in Table I below:

TABLE I

| Fuel Material | Ultimate Analysis (dry wt basis) | | | | | | | |
|---|---|---|---|---|---|---|---|---|
| | C | H | O | N | S | Ash | Btu/lb | Btu/lb CH |
| Utah Coal | 77.9 | 6.0 | 9.9 | 1.5 | 0.6 | 4.1 | 14,170 | 16,889 |
| Pittsburgh Coal #1 | 75.5 | 5.0 | 4.9 | 1.2 | 3.1 | 10.3 | 13,650 | 16,957 |
| Pittsburgh Coal #2 | 73.3 | 5.3 | 10.2 | 0.7 | 2.8 | 7.6 | 13,097 | 16,663 |
| Wyoming Coal | 70.0 | 4.3 | 20.2 | 0.7 | 1.0 | 13.8 | 14,410 | 19,394 |
| Douglas Fir Bark | 56.2 | 5.9 | 36.7 | 0.0 | 0.0 | 1.2 | 9,500 | 15,298 |
| Wood | 52.0 | 6.3 | 40.5 | 0.1 | 0.0 | 1.0 | 9,000 | 15,437 |
| Pine Bark | 52.3 | 5.8 | 38.8 | 0.2 | 0.0 | 2.9 | 8,780 | 15,112 |
| Bagasse | 47.3 | 6.1 | 35.3 | 0.0 | 0.0 | 11.3 | 9,140 | 17,116 |
| Raw Sewage | 45.5 | 6.8 | 25.8 | 2.4 | 0.5 | 19.0 | 7,080 | 13,537 |
| Bovine Waste | 42.7 | 5.5 | 31.3 | 2.4 | 0.3 | 17.8 | 7,380 | 15,311 |
| Rice Hulls | 38.5 | 5.7 | 39.8 | 0.5 | 0.0 | 15.5 | 6,610 | 14,955 |
| Rice Straws | 39.2 | 5.1 | 35.8 | 0.6 | 0.1 | 19.2 | 6,540 | 14,763 |
| MSW | 33.9 | 4.6 | 22.4 | 0.7 | 0.4 | 38.0 | 5,645 | 14,662 |
| Paper Mill Sludge | 30.9 | 7.2 | 51.2 | 0.5 | 0.2 | 10.2 | 5,350 | 14,042 |
| Sewage Sludge | 14.2 | 2.1 | 10.5 | 1.1 | 0.7 | 71.4 | 2,040 | 12,515 |
| Lignite (N.D.) | 42.4 | 6.7 | 43.3 | 1.7 | 0.7 | | 7,210 | 14,684 |
| Subbituminous B | 54.6 | 6.4 | 33.8 | 1.0 | 0.4 | | 9,420 | 15,443 |
| Ethyl Alcohol | 52.2 | 13.0 | 34.8 | — | — | — | 12,780 | 19,601 |
| Carbon | 100.0 | | | | | | 14,093 | 14,073 |
| Methane | 75.0 | 25.0 | — | — | — | — | 21,520 | 21,520 |
| Propane | 81.8 | 18.2 | — | — | — | — | 19,944 | 19,944 |
| Hexane | 83.7 | 16.3 | — | — | — | — | 19,403 | 19,403 |
| Benzene | 92.3 | 7.7 | | | | | 17,480 | 17,480 |
| No. 1 Fuel Oil | | | | | | | | 19,665 |
| No. 2 Fuel Oil | | | | | | | | 19,408 |
| No. 4 Fuel Oil | | | | | | | | 19,213 |
| No. 5 Fuel Oil | | | | | | | | 19,015 |
| No. 6 Fuel Oil | | | | | | | | 18,794 |

Organic material feeds include, without limitation, known toxic and waste materials such as:
Aldrin
Dieldrin
DDT
2,4,5-T and esters
2,4-diaminotoluene
Lindane
p-aminobenzoic acid
anthranilic acid
Alfatoxin
Heptachlor
Malathion
Nitrosamines
commuted paper waste landfill garbage and the like.

Organic toxic materials to be treated in this invention include those recognized as hazardous by the United States Environmental Protection Agency, as for example, those set out in EPA publication EPA-560/11-79-001 entitled Test Data Development Standards: Chronic Health Effects Toxic Substances Control Act; Section 4. When toxic and waste materials are used, it sometimes is only desired to utilize the heat of oxidation to aid in oxidizing of these materials to harmless products which can be taken off the oxidizer and discarded. The resultant supercritical water can be passed to other areas without removing the energy therefrom for use in power cycles. When moderate to high heating value input materials are used, useful energy is obtained which can be converted to power using steam turbines, Rankine/cycle systems and the like as known in the art. The heated water output can be used directly in heat exchangers for space heating or any heating purposes. Preferably the concentration of the organic materials is in the 2–25% by weight range of the reaction mixture. The partial list of possible feed materials in Table I shows that the heating value in BTU per pound of fuel carries over a broad range from 2,040 BTU/lb for sewage sludge to 21,520 BTU/lb for methane. The last column in Table I is the heating value in BTU per pound of carbon and hydrogen in the fuel. On this basis, the heating values vary over a much smaller range: 12,500 BTU/lb CH for sewage sludge and 15,000 BTU/lb CH for wood and bark, 16–19,000 BTU/lb CH for coals and 18–20,000 BTU/lb CH for fuel oils.

Figure 2:
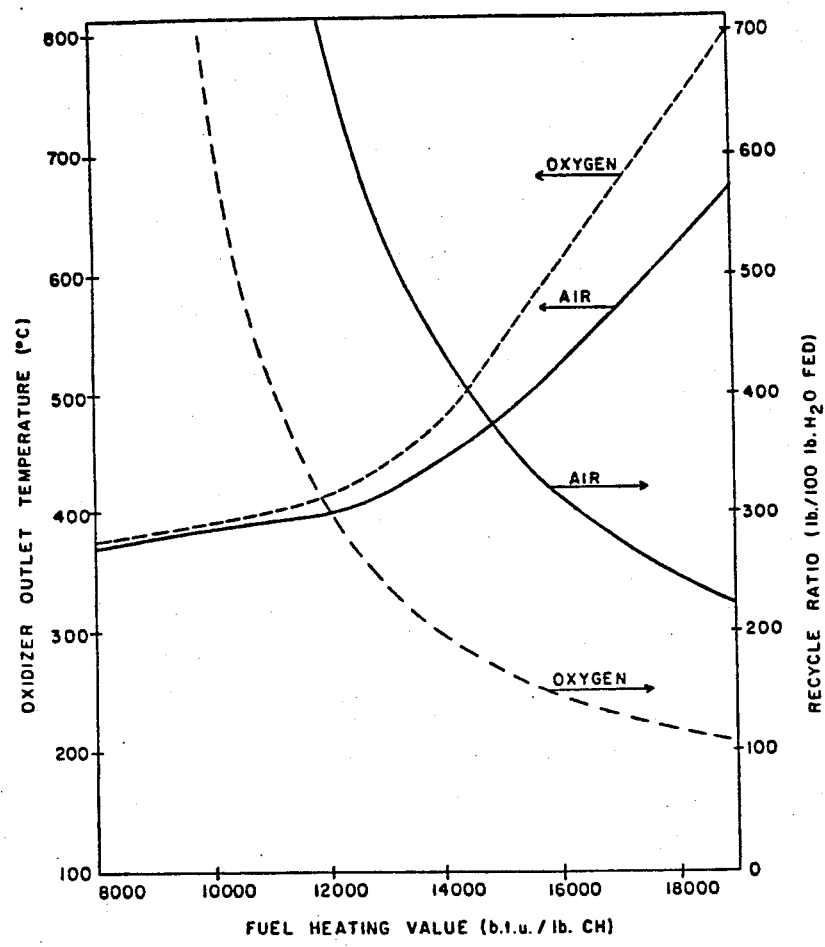
FIG. 2 is a diagrammatic showing of the effect of fuel heating value on oxidizer outlet temperature and recycle ratio.

The heating value of the fuel defines the feed concentration and recycle ratio to reach a given oxidizer outlet temperature. At a given fuel feed concentration the outlet teCmperature varies with the fuel heating value. The effect of fuel heating value on oxidizer outlet temperature and recycle ratio is shown in FIG. 2. The results of FIG. 2 were determined by the thermodynamic first law energy balance assuming negligible energy losses to the environment (Fuel conc: 10 lb CH/100 lb $H_2O$; operating pressure: 3,600 psia; no heat exchanger, oxidizer inlet temperature 377° C.). With air as oxidant, the oxidizer outlet temperature varies from 441° C. at 14,000 BTU/lb CH to 563° C. at 19,000 BTU/lb CH. If oxygen is used instead of air, the outlet temperature is somewhat higher as shown by the dash line in FIG. 2. The recycle ratio is determined by the oxidizer outlet temperature and the desired oxidizer inlet temperature. For an oxidizer inlet temperature of 377° C. the relationship between recycle ratio and fuel heating value is shown in FIG. 2 for air (solid curve) and oxygen (dash curve). Higher recycle ratios are required when air is used instead of oxygen because the inert nitrogen component of air decreases the oxidizer outlet temperature.

The specific oxidizer inlet and outlet temperatures can vary as for example depending on whether oxygen or air is used in the reaction mixture, see FIG. 2.

Figure 3:
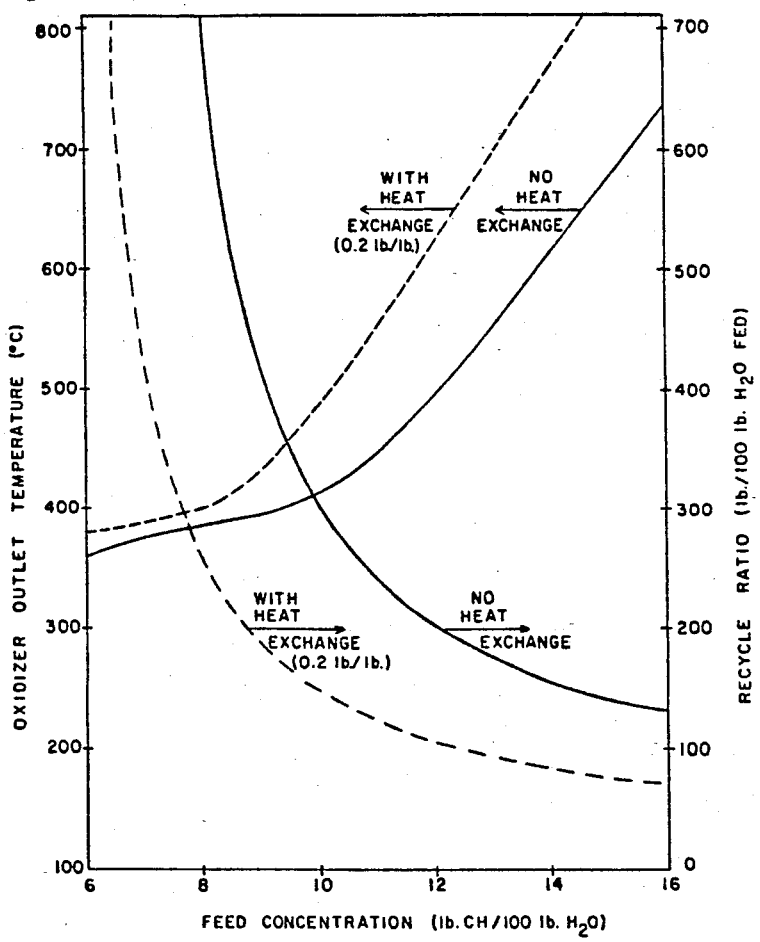
FIG. 3 is a diagrammatic showing of the effect of feed concentration on oxidizer outlet temperature and recycle ratios.

FIG. 3 shows the effect of feed preheat with a heat exchanger 41 or without it. For a feed with 12,000 BTU/lb. heating value and pure oxygen and operating pressure of 3,600 psia the oxidizer outlet temperature and recycle ratio are shown as a function of feed concentration in solid curves. Superimposed on this figure are the corresponding values (dashed curves) when 20 pounds of oxidizer effluent (per 100 pounds of feed water) are used to preheat the feed through the heat exchanger. Higher degrees of preheat (i.e., larger portions of oxidizer effluent to the exchanger) would lead to further increases in oxidizer outlet temperature and lower recycle ratios.

Basically higher temperatures are preferred at the outlet of the oxidizer so that a smaller proportion of water need be recycled to provide heat for the reaction. The outlet temperature will preferably always be above 374° C. when single phase reactions occur and preferably it is above 450° C. to maximize salt precipitation and to minimize the recycle. Thus with low heating value fuels, higher feed concentration reaction mixtures are used. In some cases, supplemental system heat exchangers are used along with the recycle to achieve the desired temperature at the inlet to the oxidizer.

The reaction often preferably is carried out at the near critical density of water which means that the temperature must be at least the critical temperature and the pressure at least the critical pressure of water. The near critical region or the term "in the region of the critical density of water" is encompassed by densities of from 0.05 to 0.7 grams per centimeter$^3$. A temperature of at least about 400° C. and a density of about 0.3 g/cc and less are preferred as conditions under which corrosion decreases as salt dissociation falls.

Figure 4:
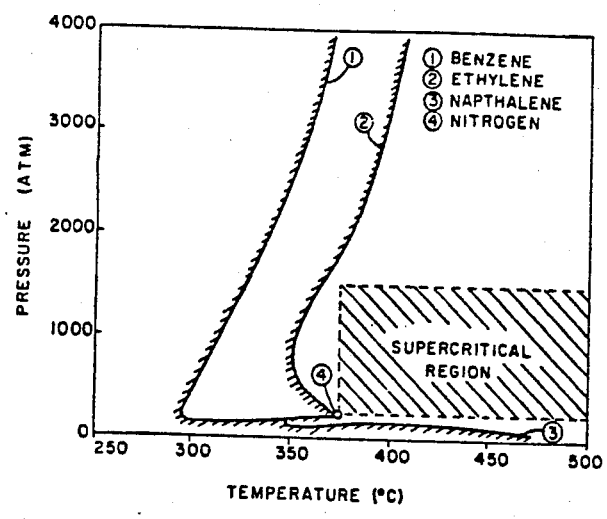
FIG. 4 is a diagrammatic showing of the critical locii of water mixtures.

Although it is preferred to have the effluent stream from the oxidizer reach a temperature and pressure condition at the near critical condition of water, this can vary in some cases. In all cases the reaction in the reaction vessel or oxidizer at some point reaches supercritical conditions, i.e., temperature and pressure conditions are such that only a single homogeneous fluid phase can exist in the mixture of reactants. FIG. 4 is a graph of pressure versus temperature showing the supercritical region, i.e., the locus of critical points for binary mixtures of water with benzene, ethylene, naphthalene and nitrogen. In all cases with the mixture used for the reactants, supercritical conditions are to the right and above the locus graphed. Since oxygen water mixtures have a locus similar to the nitrogen water mixture, it will be understood that temperatures and pressures to the right of line (4) should be obtained in the oxidizer. These conditions are close to the supercritical conditions of water alone. These supercritical conditions must occur in the oxidizer to get the single fluid phase reaction to permit full and rapid oxidation. In FIG. 4 the concentration of the organic in admixture with water increases as the lines go out from the water point at the lower right-hand corner of the water supercritical region shown on the graph.

The temperature and pressure going into the oxidizer can vary. The kindling temperature of the reaction mixture must be reached prior to entrance and supercritical conditions for the reaction mixture must occur at some point in the oxidizer due to the heat released in the adiabatic oxidation of a portion of the organic feed.

The initial temperature going into the oxidizer for materials that tend to char, i.e., pyrolize or decompose, is preferably above the char formation temperature range. For example, cellulosic materials tend to pyrolyze in the range of 150°–325° C., so they are rapidly brought to 374° C. or higher before the oxidizer effluent, by contact directly with supercritical water thus raising the temperature of the reaction mixture substantially instantaneously and minimizing char formation. On the other hand, many liquid hydrocarbon fuels do not substantially pyrolyze below 374° C. and thus can be passed in a water, oxygen reaction mixture to the oxidizer at lower temperatures as for example at least 200° C. at 220 atmospheres. Similarly, many toxic materials and wastes which are liquid or solids can enter the oxidizer under the same conditions as liquid hydrocarbon fuels. Cellulosic materials preferably enter the oxidizer at at least 350° C. and 220 atmospheres. The recycle of water from the oxidizer is used to raise the reaction mixture temperature with the amount of recycle determined by the oxidizer entrance temperature desired Preferably the feed to the reactor is above the supercritical temperature for water.

All heating is preferably obtained by recycling through line 31 using the heated water and preferably supercritical water obtained from the oxidizer. The process is continuous after startup and initial heat can be obtained from an outside source for startup.

The organics in the feed can be converted to combustible compounds such as furans, furfurals, alcohols and aldehydes by the use of a reformer in line 18 if desired so that the feed passes therethrough before mixture with air or oxygen and passage to the oxidizer. The use of a reformer to gasify organic materials under supercritical conditions is known in the art and described in U.S. Pat. No. 4,113,446 issued Sept. 12, 1978 relating to gasification processes using supercritical water. Reformers as described therein can be used in the present system if desired although in most cases, they are unnecessary.

The feed material can be in liquid form as with liquid organics, aqueous slurry form, gaseous form and solid form. When in solid form, the feed is preferably comminuted for convenience for incorporation into the feed water as a pumpable slurry.

The organic feed materials may include, generally, chlorinated organics, organic nitro compounds, and organic materials containing sulfur, phosphorous, silicon or other inorganic materials such as arsenic, tungsten or molybdenum. When these materials are subjected to supercritical water oxidation in accordance with the process of the invention, the carbon may be substantially converted to $CO_2$ and the hydrogen to $H_2O$. The chlorine atoms from chlorinated organics are liberated as chloride ions. The hetero-atoms form oxyacid anions. For example, nitro compounds are converted to nitrates, sulfur-containing materials to sulfates, and phosphorous-containing materials to phosphates. Preferably, the reaction takes place at temperatures above about 480° C. and most preferably above about 500° C., in order to enhance both carbon destruction efficiency and organic anion conversion. Either oxygen or air may be used as the oxidant. In addition, the process of the invention may be used to convert appropriate organic nitro compounds, such as amines, to $N_2$, $CO_2$, and $H_2O$ at temperatures above 500° C. and preferably at least about 600°–700° C.

When acid anions are formed by oxidation of organic materials in accordance with the invention, the anions preferably may be reacted with appropriate cations, such as, without limitation, sodium, potassium, magnesium, iron or calcium ions, and the resulting inorganic salts are precipitated out under reaction conditions. When cations are formed, such as $NH_4^{30}$, an anion may be added to form the desired precipitate. $CaCO_3$ is a preferred material for large volume systems because it is inexpensive; another preferred material is NaOH which can be easily handled. The cations may be provided from their carbonates, hydroxides or oxides. Under these circumstances, a salt separator is needed following the reactor to collect the insoluble salts which are formed. The salt separator may be a cyclone, an inclined separator, or a vessel with a fixed-bed of the metal cation material, as explained further below. The collected salts may be used as a by-product of the process, if they have sufficient commercial value.

It is a feature of this invention that inorganic materials such as salts which are highly soluble in water often lose solubility and become substantially insoluble at temperatures above 450° C. When seawater, brine or other impure waters are used as makeup water, the organic materials can provide the fuel for desalting. When the exit temperature from the oxidizer is above 450° C., conventional ash separators can be used to allow precipitation of sodium chloride, calcium chloride, ferric oxide and the like. These materials often cause problems in conventional apparatus where heat transfer is through walls of the apparatus. They tend to build up on the walls causing hot spots with subsequent destruction of the walls. In the present method, the oxidizer is a flow through oxidizer and can be, for example, a stainless steel tube covered by layers of insulation such as Min.-K. When temperatures in excess of 450° C. are generated within the oxidizer or when high concentrations of chloride are present, the inner wall of the reaction may be clad with corrosion-resistant alloys such as Hastelloy C. When large diameter reactors are employed, the inner wall may be lined with firebrick. When high concentrations of inorganic constituents are present or when solid catalysts are used to reduce the residence time required for oxidation, a fluidized bed reactor can be used to provide efficient separation of fluid effluent from solids.

Corrosion tests at about 475° to 625° C., and about 3400–4200 psi at 5000 to 10,000 ppm chloride ion for about 100 hours indicate the suitability of annealed Hastelloy C–276 and Alloy 625 for reactor design. However, corrosion difficulties arise during the cooling down of system effluent. The introduction of sodium hydroxide into the effluent stream in order to neutralize its acidity helps to minimize corrosion. The reduction of such ancillary problems, particularly where the reactor effluent becomes subcritical, is indicated within the realm of available technology, such as that of the wet air oxidation process.

The invention is further explained by the following illustrative or actual examples of procedures for oxidizing organic materials with supercritical water.

EXAMPLE 1

In a first illustrative example of the invention and using the system of FIG. 1, the feed can be fuel oil having a heating value of 19,000 BTU/lb with 8.7 pounds added to the feed slurry tank 11 along with 100 pounds of makeup water. This material is mixed and makeup water provided to a concentration of 5 to 20% by weight of the organic material with 8.7 weight percent CH in one embodiment. The mixture is pressurized to a supercritical pressure above 3200 psia with 3600 psia in one embodiment and heated to a temperature in the vicinity of the critical temperature of water, e.g., 377° C. The preheating of FIG. 1 is accomplished by directly injecting a portion of the oxidizer effluent through line 31. In some cases, a heat exchanger can be used instead of direct injection of water to recycle heat derived from the flow coming from the oxidizer. In other cases, the feed material and makeup water can be heated although this is not preferred. Air or oxygen is pressurized and mixed with the pressurized fuel water mixture at 3600 psi with the proportion of oxygen adjusted to be equal to that required to completely oxidize the feed fuel, that is, at least stoichiometric. The temperature of the mixture of fuel, oxidant and water at the entrance to the oxidizer is above the kindling temperature required for the components of the fuel that are most readily oxidized. If no catalyst is used the kindling temperature can be as high as 350°–400°C. but if catalysts are used, the kindling temperature may be as low as 200—250° C.

The mixture of reactants is fed to the oxidizer 19 which can be a tubular reactor or fluidized bed. Low length-to-diameter (L-D) ratios in the fluidized bed are desired where the inorganic content is high so as to minimize the oxidizer reactor surface area and thereby minimize deposition of inorganics on the walls of the reactor. The reactor operates adiabatically and the heat released by oxidation of readily oxidized components is sufficient to raise the fluid phase to temperatures above the critical temperature of the mixture. At that point the fluid becomes a single, homogeneous phase. For 8.7 weight percent of fuel oil in the feed, with air as the oxidant, the heat of oxidation is sufficient to raise the oxidizer outlet temperature to 565° C.

The effluent from the oxidizer is fed to the ash separator 25 where inorganics originally present in the feed and/or water are removed. The ash separator can be a cyclone, a settling column or any suitable solid-fluid separator.

A portion of the superheated supercritical water is recycled to the eductor 17 upstream of the supercritical oxidizer. This operation provides for sufficient heating of the feed to bring the oxidizer effluent to supercritical conditions. The remainder of the superheated supercritical water is available for power generation, heating or use as high pressure steam. A portion of available energy is used to generate the power required to pressurize feed and oxidant. The energy required to pressurize the oxidant is recovered in the expansion of the products of oxidation in the superheated supercritical water turbine. In this example, the temperature at the inlet of the oxidizer 19 is 377° C., 258 pounds of water are recycled through line 31 with the outlet in line 24 being at a temperature above the critical conditions of water and having a temperature of 565° C. for 106 pounds water, 29 pounds of carbon dioxide and 105 pounds of nitrogen.

This method of oxidation is analogous to that of a turbo-jet or gas turbine. The process illustrated does not require heat transfer through surfaces as in conventional fuel oil boilers. This is a major advantage resulting from the invention. In the conventional processes for generating supercritical steam, boiler feed water must be extremely pure to minimize deposition and buildup of inorganics on the water side of the boiler tubes. The direct oxidation of fuels or other organics in water avoids this problem completely and thus allows one to take full advantage of the high thermodynamic efficiency of generating power with supercritical steam. In fact it is possible to use impure water such as brine or seawater as feed because the inorganic salts are removed in the ash separator. The high temperature, high pressure steam produced by the process can thus be used as a source of desalinated water after condensation and removal of carbon dioxide and nitrogen if air is used as the oxidant.

EXAMPLE 2

In a second example using the system of FIG. 1, Douglas fir bark is processed in steps similar to those described above in the first example. The heating value of the Douglas fir bark (9,500 BTU/lb.) is considerably less than that of fuel oil. Therefore a higher weight fraction of feed (11.6 lbs. CH) 16.1 pounds bark to 100 pounds of water is required to reach the same oxidizer effluent temperature of 565° C. Since the recycle ratio is determined by the energy required to bring the feed to the desired oxidizer inlet temperature, an increase in feed concentration results in decrease in recycle ratio. 298 pounds of oxidizer effluent per 100 pounds of water feed must be recycled with bark feed whereas about 259 pounds is recycled when fuel oil is the feed.

In the second example, the temperature in line 27 is 565° C., 100 pounds of water in the line contains 39.2 pounds of carbon dioxide and 141 pounds of nitrogen. The inlet temperature to the oxidizer is 377° C. and the operating pressure is 3600 psia when 11.6 pounds CH, that is 16.1 pounds bark of Douglas fir (9,500 BTU/lbs.), is used with oxygen. Bark and the like when used in this invention is comminuted into particles preferably having a size of about ¼ mm or less.

The process illustrated in FIG. 1 when used for generating high pressure steam from forest product wastes has several advantages over conventional processes that are used for the same purpose. Drying of feed is unnecessary because water is used as the carrier fluid for oxidation. Oxidation is effected rapidly and yet under safe controlled conditions. Auxiliary equipment for pollution control is not necessary because the oxidation products are maintained within the system.

EXAMPLE 3

In a third example a reformer (not shown) is put in the line 18 and comprises merely a tube which permits reforming of coal used as the feed. In this example 10 pounds CH of fir bark (9,500 BTU/lb.) is considerably less than that of fuel oil. Therefore a higher weight fraction of feed (1.6 lbs. CH) 16.1 pounds bark to 100 pounds of water is required to reach the same oxidizer effluent temperature of 565° C. is 565° C. with a mixture of 107 pounds water, 33 pounds $CO_2$, and 121 nitrogen when air is used as the oxidizing agent. The operating pressure of the system is 3,600 psi. The reformer provides sufficient residence time in an oxidant-free environment to allow a significant portion of the solid fuel to be solubilized. As described in U.S. Pat. 4,113,446 solids such as wood, coal and the like can be dissolved to an appreciable extent in water under supercritical conditions. Where such solids are to be subsequently oxidized, it may be advantageous to first dissolve them in the supercritical water phase. The effect of reforming may provide for a significantly lower kindling temperature in the oxidizer. Where the oxidation is solid catalyzed, this solution prior to catalytic oxidation can also facilitate mass transfer of fuel to the surface of the solid catalyst thereby enhancing the oxidation rate. However, in many cases, no distinct reforming step is required and the materials are solubilized in passage to the oxidizer.

EXAMPLE 4

In a further example showing the oxidation of sewerage sludge, a system as shown in FIG. 1 is used using sewerage sludge having a BTU output of 2,000 BTU/lb.

13.3 pounds CH (81.6 pounds sludge) is used with 100 pounds of makeup water operating at a pressure of 3600 psi with a recycle of 169.4 pounds of water from the oxidizer and an input temperature of 377° C. to the oxidizer. When oxygen is used as the oxidant, the temperature at the oxidizer outlet is 1050° F. with 109.3 pounds of water and 44.9 pounds of $CO_2$ in line 27. This system can also be used with toxic and hazardous chemicals in low amounts as in wastes, feed lots wastes, agricultural by-products, textiles wastes, carpet wastes, rubber by-products, forest product wastes, paper and pulp mill wastes and the like.

Disposal by oxidation of sewerage sludge waste is representative of one of the more difficult wastes in the sense that the heating value of the sludge typically runs around 2,000 BTU/lb. of sludge. A process for oxidizing sludge as described differs from those described previously in that the oxidant is preferably relatively pure oxygen (98%). The high percentage of oxygen enables relatively lower sludge feed concentrations than if air were used.

EXAMPLE 5

Figure 1A:
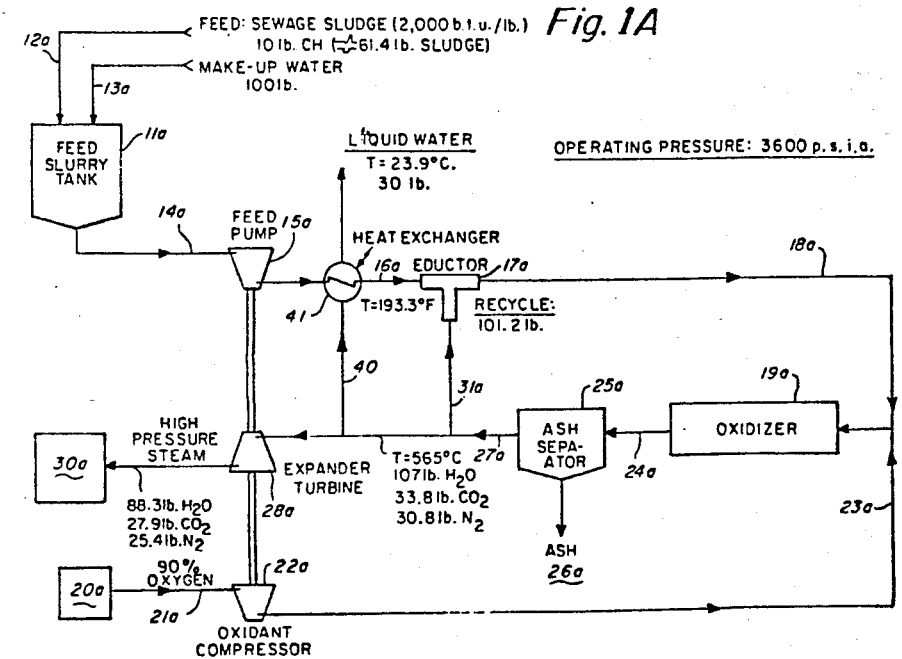
FIG. 1A is a schematic diagram of an alternate embodiment thereof.

In another example, sewerage sludge in an amount of 10 pounds CH (61.4 pounds sludge) is mixed with 100 pounds of water in a system substantially as set up with respect to FIG. 1. This example is diagrammatically illustrated in FIG. 1A where all numbered parts marked "a" are identical to corresponding numbered parts of FIG. 1. Water in an amount of 30 pounds at a temperature of 24° C. is removed from a heat exchanger 41 which receives water in the near critical region through line 40. The preheating of water in line 16a is necessary to get enough heat at the entrance to the oxidizer so that the entrance value is 377° C. thereby allowing single phase operation of the oxidizer. Line 27a has a temperature of 549° C. with 107 pounds water, 33.8 pounds $CO_2$ and 30.8 pounds $N_2$ passing through the turbine after the recycle extraction to give 88.3 pounds of water, 27.9 pounds $CO_2$ and 25.4 pounds $N_2$. Ninety percent oxygen is used. Thus a feed of 61 pounds sludge and 100 pounds water is preheated to 193° C. by passing 30 pounds of oxidizer effluent to the heat exchanger. The effect of indirect preheat of the feed is similar to that of increasing feed heating value or concentration. The recycle ratio necessary to reach a given oxidizer inlet temperature is decreased. At the same time, the oxidizer outlet temperature is increased because the heat of oxidation is taken up by a small quantity of fluid passing through the reactor.

EXAMPLE 6

The following examples, unlike the foregoing, set forth in detail actual experiments. These were chosen to further illustrate the embodiments of this invention.

Figure 5:
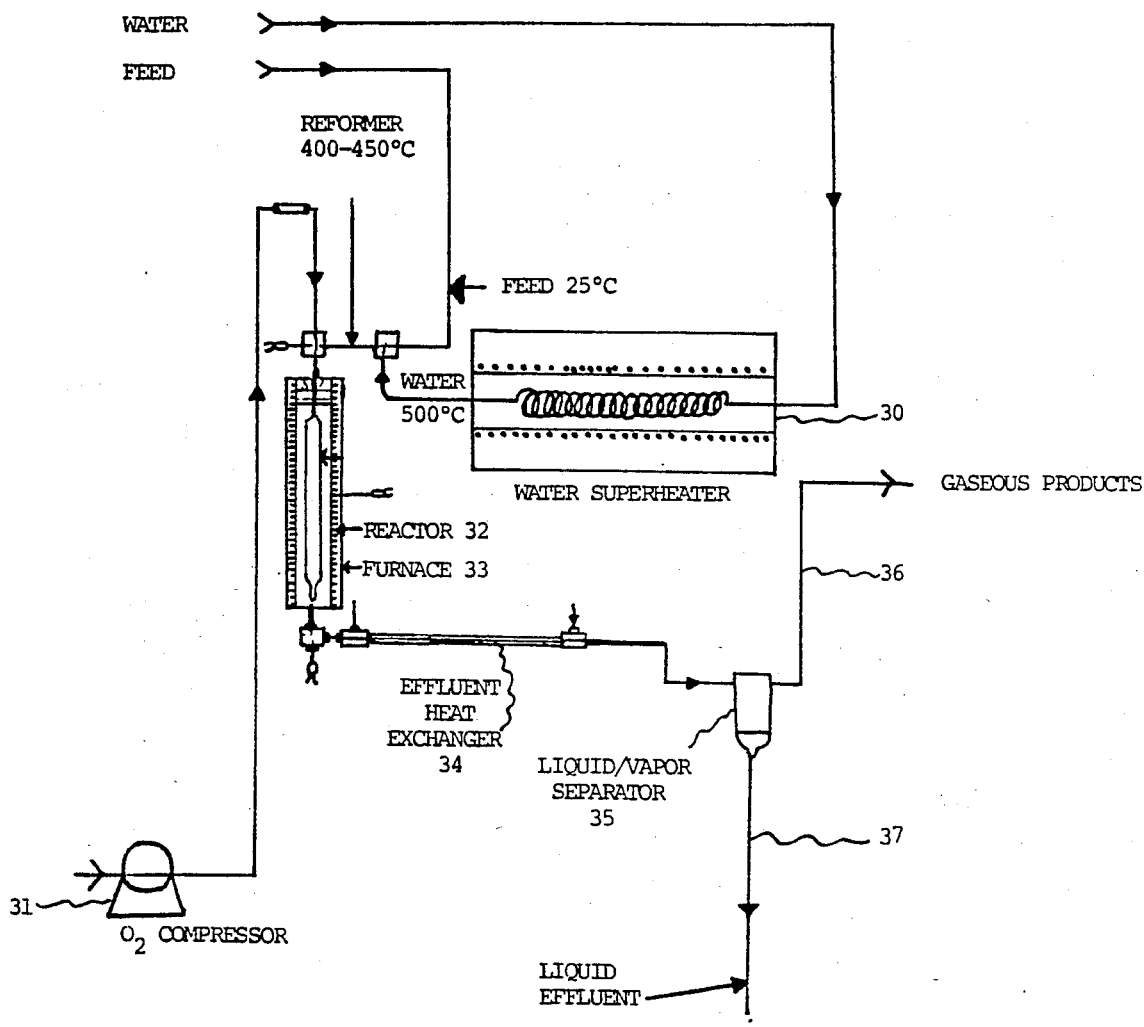
FIG. 5 is a schematic of a small scale supercritical water oxidation system.

In this example, chlorinated organics were treated in a continuous bench-scale system in accordance with FIG. 5, with an organic throughput of one gallon per day. The organic feed was brought to 3500–4000 psi and 25° C., and mixed with water which had been superheated in water superheater 30 to about 500° C. at system pressure. Oxygen, compressed by means of compressor 31, was added to the water/organic mixture and passed into reactor 32, which was encased in tube furnace 33. As depicted, the feed is quickly brought up to 400°–450° C. in a short length of tubing prior to being admixed with oxygen. The oxygen can be admixed with the aqueous organic feed immediately prior to the reactor entrance (as depicted) or the aqueous organic material and oxygen can be separately fed to the reactor and admixed immediately after entrance into the reactor.

The reactor was constructed from Hastelloy C-276, with an inside diameter of 0.88 inches and a length of 2 feet. The reactor effluent was cooled to room temperature in heat exchanger 34 and depressurized to atmosphere. The liquid and vapor effluent was passed into a liquid/vapor separator 35 and the gaseous products were removed from the system through line 36 and the liquid products were removed through line 37. Liquid effluents were analyzed for total organic carbon, pH, and by ion-selective electrodes and gas chromatography/mass spectrometry (GC/MS). Gaseous effluents were analyzed by gas chromatography (GC) for low molecular weight hydrocarbons and permanent gases. The terminology used to describe the results is given in Table 2.

The feed materials and compositions for each run carried out are given in Table 3. A summary of the results is given in Table 4. The mass spectra were searched for the following compounds: para-chlorophenol; para-chlorobenzaldehyde; para-chloroacetophenone; para-chlorobenzoic acid; 4,4′ dichlorobenzophenone; 4,4′-dichlorobenzil; 3,6-dichloro-9-methylene-fluorene; 3,6-dichloro-9-fluorenone; [1,1-bis (para-chlorophenyl)]-2-chloroethylene (and an isomer thereof); [1,1-bis (para-chlorophenyl)] ethylene; [1,1-bis (parachlorophenyl)]-2 2-dichloroethylene ("DDE"); 4-chlorobiphenyl; [4,4′-bis (chloro)] biphenyl; [1,1-bis (para-chloro)]-2,2,2-trichloroethane; 3,4,7,8-tetrachloro-dibenzo-1,4-dioxane.

Only compounds found in at least one experiment are given in Table 4. Chlorinated dibenzo-p-dioxins were never found in any effluent. It is believed likely that the DDE found in the effluent of run B is the result of cross-contamination of samples from the low pressure, room temperature portion of the bench-scale system, since it is extremely unlikely that DDE was formed by reaction or rearrangement of any of the chlorinated organics of the feed. Similarly, since the residual organic chlorides identified in the run D effluent are all DDT-related species, it is probable that these are cross-contaminants from run C. The run D effluent was also, specifically, searched by mass spectroscopy for trace quantities of tri-, tetra-, penta-, and hexa-chlorobiphenyl, as well as the compounds listed above. At the detection limit of less than 10 parts per billion, none of these chlorinated biphenyls were found, indicating a chlorinated biphenyl conversion efficiency of greater than 99.9994% if the compounds indicated in Table 4 are discounted as cross-contaminants. These results show that at about 500° C., organic chlorides can be destroyed by supercritical water oxidation with efficiencies of about 99.99%, based on carbon destruction efficiency or organic chloride conversion.

TABLE 2

| Definition of Terms | |
|---|---|
| Residence Time | = Volume of reactor divided by volumetric flow rate of process fluid. |
| Organic Carbon In (ppm) | = Carbon content of organic/water feed mixture |

TABLE 2-continued

Definition of Terms

| | | |
|---|---|---|
| Organic Carbon Out (ppm) | = | as it enters the reactor.<br>Total carbon in liquid effluent after sparging or total carbon minus inorganic carbon. |
| Destruction Efficiency | = | $\dfrac{(\text{Organic Carbon In} - \text{Organic Carbon Out})}{\text{Organic Carbon In}} \times 100$ |
| Combustion Efficiency | = | $CO_2/(CO_2 + CO + CH_4) \times 100$<br>concentration in the effluent vapor, as measured by GC analysis. |
| Organic Chloride In (ppm) | = | Chloride content of organic/water feed mixture, as it enters the reactor. |
| Organic Chloride Out (ppm) | = | Residual organic chloride as determined by GC/MS. |
| Organic Chloride Conversion | = | $\dfrac{(\text{Organic Chloride In} - \text{Organic Chloride Out})}{\text{Organic Chloride In}} \times 100$ |

TABLE 3

Composition of Feed Mixtures for Runs A–E

| | | Wt % | Wt % Cl |
|---|---|---|---|
| Run A | | | |
| 1,1,1-trichloro-2,2-bis(p-chlorophenyl)ethane ("DDT") | $C_{14}H_9Cl_5$ | 4.32 | 2.133 |
| Methyl ethyl ketone ("MEK") | $C_4H_8O$ | 95.68 | — |
| | | 100.0 | 2.133 |
| Run B | | | |
| 1,1,1-trichloroethane | $C_2H_3Cl_3$ | 1.01 | 0.806 |
| 1,2-ethylene dichloride | $C_2H_2Cl_2$ | 1.01 | 0.739 |
| 1,1,2,2-tetrachloroethylene | $C_2Cl_4$ | 1.01 | 0.866 |
| o-chlorotoluene | $C_7H_7Cl$ | 1.01 | 0.282 |
| 1,2,4-trichlorobenzene | $C_6H_3Cl_3$ | 1.01 | 0.591 |
| biphenyl | $C_{12}H_{10}$ | 1.01 | — |
| o-xylene | $C_4H_8O$ | 5.44 | — |
| MEK | $C_4H_8O$ | 88.48 | — |
| | | 100.0 | 3.284 |
| Run C | | | |
| hexachlorocyclohexane | $C_6H_6Cl_6$ | 0.69 | 0.497 |
| DDT | $C_{14}H_9Cl_5$ | 1.00 | 0.493 |
| 4,4'-dichlorobiphenyl | $C_{12}H_8Cl$ | 1.57 | 0.495 |
| hexachlorocyclopentadiene | $C_5Cl_6$ | 0.65 | 0.505 |
| MEK | $C_4H_8O$ | 96.09 | — |
| | | 100.0 | 1.99 |
| Run D | | | |
| PCB 1242 | $C_{12}H_xCl_{4-6}$ | 0.34 | 0.14 |
| PCB 1254 | $C_{12}H_xCl_{5-8}$ | 2.41 | 1.30 |
| transformer oil | $C_{10}-C_{14}$ | 29.26 | — |
| MEK | $C_4H_8O$ | 67.99 | — |
| | | 100.0 | 1.44 |
| Run E | | | |
| 4,4'-dichlorobiphenyl (DCBP) | $C_{12}H_8Cl$ | 3.02 | 0.96 |
| MEK | $C_4H_8O$ | 96.98 | — |
| | | 100.0 | 0.96 |

TABLE 4

Summary of Results: Oxidation of Organic Chlorides

| Run No. | A | B | C | D | E |
|---|---|---|---|---|---|
| Temperature (°C.) | 505 | 495 | 488 | 510 | 500 |
| Residence Time (min) | 3.7 | 3.6 | 3.5 | 3.7 | 4.4 |
| Carbon Analysis | | | | | |
| Organic Carbon In (ppm) | 26,700 | 25,700 | 24,500 | 38,500 | 33,400 |
| Organic Carbon Out (ppm) | 2.0 | 1.0 | 6.4 | 3.5 | 9.4 |
| Destruction Efficiency (%) | 99.993 | 99.996 | 99.975 | 99.991 | 99.97 |
| Combustion Efficiency (%) | 100. | 100. | 100. | 100. | 100. |
| Gas Compression | | | | | |
| $O_2$ | 25.58 | 32.84 | 37.10 | 10.55 | 19.00 |
| $CO_2$ | 59.02 | 51.03 | 46.86 | 70.89 | 70.30 |
| $CH_4$ | — | — | — | — | — |
| $H_2$ | — | — | — | — | — |
| CO | — | — | — | — | — |
| Excess Oxygen % | 31.7 | 47.3 | 57.9 | 10.5 | 19.8 |
| Chloride Analysis | | | | | |
| Organic Chloride In (ppm) | 876. | 1266. | 748. | 775. | 481. |
| Organic Chloride Out (ppm) | .023 | .037 | <.028 | .032 | .036 |
| Organic Chloride Conversion (%) | 99.997 | 99.997 | 99.996 | 99.996 | 99.993 |
| GC/MS Effluent Analysis (ppb Cl) | | | | | |
| Para-chlorobenzaldehyde | — | — | — | — | — |
| Para-chloroacetophenone | — | — | — | — | — |
| 4,4'-dichlorobenzophenone | — | 9 | — | 14 | — |
| 4,4'-dichlorobenzil | 18 | 12 | 18. | — | — |
| 3,6-dichloro-9-fluorenone | — | — | <4. | — | — |
| 1,1-bis(para-chlorophenyl)-2,2-dichloroethylene ("DDE") | 5 | 16 | <5. | 6 | — |
| 4-chlorobiphenyl | — | — | 0.2 | — | — |

TABLE 4-continued

Summary of Results:
Oxidation of Organic Chlorides

| Run No. | A | B | C | D | E |
|---|---|---|---|---|---|
| 4,4'-bis(chloro)biphenyl | — | — | 0.3 | — | 36 |
| 1,1-bis(parachloro) 2,2,2-trichloroethane | — | — | — | 12 | — |

Further details of the analytical technique and the experiment are set forth in my declaration of Aug. 13, 1981 in my U.S. patent application Ser. No. 147,946 filed May 8, 1980.

EXAMPLE 7

A further series of runs were conducted in accordance with the procedures set forth above. The feed materials were Run F—pure cyclohexane; Run G—a solution of biphenyl in cyclohexane; Run H—1 wt % 2,4-dinitrotoluene in methyl ethyl ketone—Run I—3 wt % 4,4'-dichlorobiphenyl in methyl ethyl ketone.

TABLE 5

| Example No. | F | G | H | I |
|---|---|---|---|---|
| Temperature (°C.) | 390–445 | 393–450 | 519 | 554 |
| Residence Time | 6–8 | 6–8 | 1.4 | 0.9 |
| Carbon Analysis | | | | |
| Organic In (ppm) | 21,400 | 28,700 | 9,800 | 19,100 |
| Organic Out (ppm) | 5.8 | 7.5 | 7.1 | 0.1 |
| Destruction Efficiency (%) | 99.97 | 99.97 | 99.93 | 99.9994 |
| Combustion Efficiency (%) | 99.5 | 99.8 | 99.5 | 100. |
| Gas Composition | | | | |
| $O_2$ | 24.8 | 17.7 | 11.19 | 23.2 |
| $CO_2$ | 74.3 | 81.8 | 83.95 | 75.6 |
| $CH_4$ | 0.4 | 0.1 | 0.15 | — |
| $H_2$ | — | — | 0.01 | — |
| CO | — | 0.1 | 0.26 | — |
| Excess Oxygen | | | 8.8 | 21.9 |

EXAMPLE 8

These runs illustrate the effect of temperature on the degree of oxidation. The feed and residence time in the three runs were methyl ethyl ketone and 0.9 minutes, respectively. The results are shown in Table 6. The temperature varied from 404° C. (Run A) to 453° C. (Run B) to 496° C. (Run C). At 404° C., the destruction efficiency was 92.6%. The gas effluent contained a significant quantity of carbon monoxide. At 453° C., the destruction efficiency was 98.5% and the concentration of carbon monoxide was reduced to 2.5%. At 496° C., the destruction efficiency exceeded 99.9% and the carbon monoxide concentration was reduced still further to 0.11%. At still higher temperatures, destruction efficiencies of 99.99% to 99.9999% can be achieved at residence times below 1 minute.

TABLE 6

| Example No. | 9 | 10 | 11 |
|---|---|---|---|
| Temperature (°C.) | 404 | 453 | 496 |
| Residence Time | 0.9 | 0.9 | 0.9 |
| Carbon Analysis | | | |
| Organic In (ppm) | 9,909 | 9,590 | 9,884 |
| Organic Out (ppm) | 732. | 147. | 7.7 |
| Destruction Efficiency (%) | 92.61 | 98.47 | 99.92 |
| Combustion Efficiency (%) | 86.34 | 96.95 | 99.81 |
| Gas Composition | | | |
| $O_2$ | 21.42 | 13.49 | 14.07 |

TABLE 6-continued

| Example No. | 9 | 10 | 11 |
|---|---|---|---|
| $CO_2$ | 66.98 | 81.47 | 79.48 |
| $CH_4$ | .04 | .11 | .04 |
| $H_2$ | .45 | .14 | — |
| CO | 10. | 2.46 | .11 |
| Excess Oxygen (%) | 6.9 | 8.4 | 12.5 |

EXAMPLE 9

This example shows the breakdown of urea into nitrogen gas, carbon dioxide and water without the use of a specific catalyst, using the process of the invention. In the system of the example, water is pumped up to a system operating pressure of 3700 psi and passed through a fluidized sand bath to be heated to approximately 450° C. The resulting supercritical water is mixed with the pressurized feed material. By this means, the feed is rapidly brought to supercritical conditions which is essential to the avoidance of charring. The combined water/feed stream is maintained at about 400° C. Oxidant is introduced directly into the reactor through a fritted filter element. The 150 cc reactor is fabricated of Inconel 625 for reasons of corrosion resistance and high temperature strength. The reactor closure is a modified Bridgman type seal. Upon leaving the reactor, the stream is cooled in a double pipe heat exchanger. It then enters a high pressure vapor-liquid separator operated by two control valves. The gaseous effluent from this separator proceeds to on-line analysis by gas chromatography, NDIR CO and $CO_2$ meters, a paramagnetic oxygen meter, and a chemiluminescent $NO_x$ analyzer. The liquid effluent from the high pressure separator proceeded to a low pressure vapor-liquid separator, where gases which were dissolved at high pressure are released. These gases are also fed to the on-line analytical equipment. The liquid effluent from the low pressure separator is measured on-line for pH, and then collected for a sample. The liquid samples, taken every half hour, are analyzed for ammonia, nitrate and nitrite. During a run, system operating parameters such as temperatures, pressures, and flow rates are continuously monitored by a Macsym process computer (Analog Devices) which controls system temperature and the vapor-liquid separators.

The conditions for the runs are summarized in Table 7. The temperatures given represent an average of measurements taken at several points along the external wall of the reactor. A 50% wt/wt urea/water solution was continuously pumped through the system at flow rates of approximately 5 cc/minute. Water was added at the rate of 20 cc/minute for a final feed concentration of 10% urea. At the conditions studied, the density of water ranges from 0.077 to 0.063 grams/cc. In the first four runs shown in Table 7 the system pressure was maintained by a back pressure regulator rather than a high pressure vapor-liquid separator, which was substituted in the fifth run. Two-phase flow across the back pressure regulator led to somewhat erratic pressure control, in addition to frequent regulator failures. The oxidant delivery system was also upgraded after the first four runs. A 500 cc ballast tank and a constriction loop were added after the compressor to give a steady oxidant flow rate. During operation, any pressure surges due to the reciprocating action of the water and feed pumps are effectively damped by the compressible supercritical fluid in the reactor.

As mentioned, temperature was determined at a number of points on the outside wall of the reactor. There were substantial temperature gradients along the wall, usually on the order of 50° C. In Run E, however, the reaction exotherm heated the wall from about 600° C. at the reactor top to about 820° C. at the reactor bottom. The experimental results are given in Table 8. The conversion of urea to N is initiated at an average wall temperature below 561° C. The amount of $N_2$, produced increases steadily with temperature. At 670° C., essentially all nitrogen in the feed leaves the system as $N_2$. Conversely, ammonia content of the liquid effluent decreases steadily with temperature, and is present in negligible amounts at the highest temperature. The pH of the liquid effluent is directly related to the concentration of the ammonia.

Nitrous oxide also appears in the range of 561° C. It peaks in concentration between 587° C. to 632° C. and disappears at 670° C. Formation of $N_2$ gas is favored over formation of $N_2O$ at all temperatures. $N_2O$ may, however, be an intermediate.

Throughout all runs no methane, $H_2$ or CO were detected in the gaseous effluent. $NO_x$ gases were searched for in Run E by the extremely sensitive and specific method of chemiluminescence. No $NO_x$ gases were detected. It is possible that $NO_x$ gases were present in the first four runs, since the chemiluminescent analyzer was not on-line. However, $NO_x$ formation should be more favored at higher temperatures.

In the first four runs, ammonia, and nitrate determinations for the liquid effluent were run by wet chemistry and ion-specific electrode, respectively. Nitrogen balances were poor, due in part to an analytical problem. The major loss of nitrogen, however, was due to formation of a white precipitate shown by elemental analysis to have a composition of 17.56% N, 15.99% C, 6.22% H, and 60.23% O which corresponds to the molecular formula for ammonium bicarbonate. Ammonium bicarbonate decomposes at 58° C., and thus would not be present in the reactor but would precipitate upon cooling. For Run E, ammonia, nitrite and nitrate analyses were carried out by an EPA certified laboratory. The result for nitrate (0.17 ppm) was well below current drinking water quality standards (10 ppm). In addition, the low level of ammonia would not lead to any loss of nitrogen through solid precipitation.

TABLE 7

Summary of Run Conditions: 10% Urea in Water

| Run | A | B | C | D | E |
|---|---|---|---|---|---|
| Oxidant | $O_2$ | $O_2$ | $O_2$ | $O_2$ | 40% $O_2$ in He |
| Temperature (°C.) | 561 | 596 | 621 | 632 | 670 |
| Residence Time (sec) | 25.9 | 25.1 | 23.1 | 22.2 | 19.4 |
| Flow Rate (cc/min) Water | 20.1 | 20.3 | 20.3 | 20.4 | 19.9 |
| Feed (50% Urea/$H_2O$) | 5.0 | 4.8 | 4.9 | 5.0 | 5.4 |
| Liquid Effluent | 24.2 | 25.9 | 26.9 | 25.4 | 24.8 |
| Gas Effluent | 1648 | 1622 | 1589 | 2027 | 2144 (5361*) |
| % Stoichiometric | 99 | 101 | 94 | 93 | 111 |

TABLE 7-continued

Summary of Run Conditions: 10% Urea in Water

| Run | A | B | C | D | E |
|---|---|---|---|---|---|
| $O_2$ | | | | | |

*Values in parentheses represent the actual measured quantities. For Run E, with 40% helium present, values are normalized for comparison purposes.

TABLE 8

Summary of Results: 10% Urea in Water

| Run | A | B | C | D | E |
|---|---|---|---|---|---|
| Temperature (°C.) | 561 | 596 | 621 | 632 | 670 |
| Nitrogen In (mg/l) water + feed | 51422 | 50501 | 50825 | 50935 | 56679 |
| Effluent Liquid Composition (mg/l) | | | | | |
| Nitrate N | 100 | 85 | 29 | 57 | .04 |
| Nitrite N | — | — | — | — | 0.005 |
| Ammonia N | 17537 | 15798 | 3447 | 2719 | 1.65 |
| Effluent pH | 9.21 | 8.95 | 7.92 | 7.52 | 7.24 |
| Effluent Gas Composition (mole %) | | | | | |
| $O_2$ | 95.59 | 90.18 | 37.61 | 20.46 | 8.09 (3.63)* |
| $CO_2$ | 0.45 | 1.05 | 18.38 | 38.48 | 41.28 (18.53) |
| $N_2$ | 3.60 | 7.92 | 41.72 | 39.04 | 50.63 (22.73) |
| $N_2O$ | 0.37 | .85 | 2.33 | 0.51 | 0.00 (0.00) |
| Nitrogen Recovery % | 31.8 | 38.3 | 65.3 | 73.7 | 97.7 |

*Values in parentheses represent the actual measured quantities. For Run E, with 40% helium present, values are normalized for comparison purposes.

The results of these runs show that the supercritical water oxidation process is capable of the complete breakdown of urea to nitrogen, carbon dioxide and water. In the normal incineration of nitrogen containing compounds, injection of urea into stack gas effluent accompanied by rapid cooling is used to prevent the formation of $NO_x$ compounds. In the supercritical water oxidation system, the combustion and scrubbing steps occur simultaneously. Also, the solvating effects of the supercritical water environment have the potential of lowering the energy of activation of the oxidation of ammonia to nitrogen gas.

The process of this invention may be used to convert nitrogen containing organic compounds substantially completely to nitrogen, carbon dioxide and water; under less severe conditions, the effluent would include ammonia. Useful temperatures are about 550° C. and greater for destruction of nitrogen-containing organics, and temperatures of about 650° C. and greater are preferred for conversion of such compounds to nitrogen ($N_2$) and carbon dioxide. Below about 550° C. ammonia is the dominant N-containing product whereas at about 650° C. nitrogen ($N_2$) is dominant.

Example 10

In many applications of this invention, it will be desirable to remove inorganic materials by precipitation from the supercritical process stream. A good example is in the treatment of chlorinated hydrocarbon wastes, where HCl is a product of the oxidation reaction. This HCl can be neutralized by addition of NaOH, resulting in the formation and precipitation of NaCl. With sufficient crystal growth, the NaCl precipitate would be collectible in an inclined settler or a cyclone separator.

These experiments were directed to the neutralization of HCl which was formed by oxidation of trichloroethylene (TCE) in methyl ethyl ketone (MEK). The experiments were all of a semi-batch type, in which solid was allowed to accumulate in a high temperature, high pressure, inclined solid separator for the duration of the run. After the run, the solid separator was opened and the solids collected for analysis.

Run A—Base After Oxidant

Figure 6:
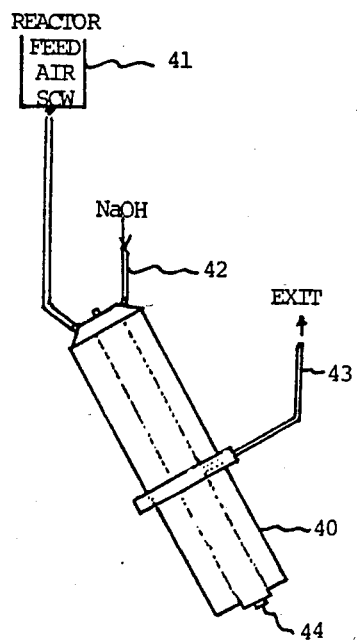
FIGS. 6–8 are diagrams of salt separation systems.

FIG. 6 shows the setup of the solid separator 40 (a Hastelloy C-276 tube) for this experiment. The TCE/MEK was first dissolved in supercritical water and then exposed to oxygen in the reactor 41, shown in part, at about 537° C. The separator wall temperature was about 545° C. The first few hours of the run were carried out without neutralization in order to establish a baseline chloride level from the reactor. Once a steady level of about 1100 ppm Cl$^-$ was attained, 0.5 M NaOH was introduced from inlet 42 at a stoichiometric rate of flow. The fluid effluent was collected from the exit tube 43. Little effect was noted, so the caustic flow rate was doubled. Again, little change in the effluent chloride level was evident, so the NaOH feed was switched to a 2 M solution and the flow rate returned to its original setting. After an hour, the flow rate was doubled again. The hydroxide was now being introduced at 8 times the amount required for stoichiometric neutralization. The chloride concentration in the effluent levelled off at about 200 ppm after a few hours. Sodium levels in the effluent were about 20 ppm. The effluent pH reached a final value of about 2.2, which corresponds to acidity due to HCl.

To terminate the run, feed, caustic, and water pumps were shut off and the air switched to pure $N_2$. Nitrogen was passed through the hot, pressurized system for about one hour, in order to dry the solids collected. Upon completing the drying procedure, the nitrogen flow and system heaters were shut off.

The solids were collected and analyzed as shown in Table 9. Except for sample 2, over 94% of each solid was accounted for by carbonate, chloride and sodium ion analyses. The white color in the samples is due to sodium carbonate and sodium chloride. The brown color is probably due to nickel and iron oxides, and the yellow color to chromium or iron salts.

Equilibrium calculations showed NaCl to be the expected neutralization product. The formation of large quantities of sodium carbonate was apparently because the NaOH neutralized $CO_2$ immediately upon entering the reactor, and was effectively immobilized as a solid mass of sodium carbonate. Most of the HCl-containing feed stream bypassed this neutralizing bed until near the end of the run, when it had built up sufficiently to cover the entire separator cross-section, and, in effect, served as packed bed of sodium carbonate for Cl$^-$ removal.

TABLE 9

| Sample* | CO$_3$= | Cl$^-$ | Na+ | Total | Description |
|---|---|---|---|---|---|
| 1 | 51.4 | 2.9 | 43.6 | 97.9 | White and brown, densely packed. |
| 2 | 34.2 | 6.7 | 31.7 | 72.6 | Yellow and brown. |
| 3 | 50.4 | 1.5 | 42.4 | 94.3 | Mostly white, some brown areas. |
| 4 | 48.0 | 4.6 | 42.0 | 94.6 | White, brown and yellow portions. |

*Samples 1–3 were in adjacent descending positions taken from the top of the separator and sample 4 was taken from the bottom of the separator.

Run B—Base Before Oxidant

Figure 7:
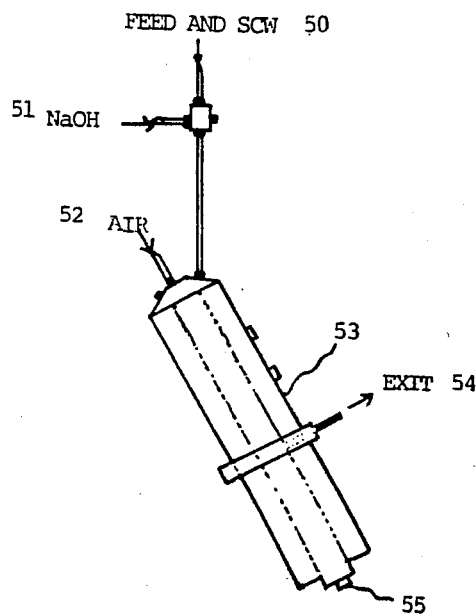

An experiment was designed to allow contact between NaOH and HCl before any carbonate could be formed. The setup for these runs is shown in FIG. 7. The equipment was the same as that in Run A except that the feed sequence was modified. The feed and supercritical water were mixed first, 50, followed by addition of the caustic, 51. This mixture and the air, 52, were separately fed to the separator 53. The fluid effluent was collected from the exit port 54. In this system the reactor or oxidizer also serves as a separator device for the salt.

For the actual run, the system was brought to pressure and temperature (about 547° C.) and feed was started. The feed reached the solid separator 52 in about 15 minutes, as indicated by thermocouple readings (the separator wall temperature was about 553° C.), and stoichiometric caustic flow was then begun. System pressure remained steady for about 2 ½ hours, and then began to climb. Within 15 minutes, pressures exceeded 5200 psi and feed, hydroxide, and water flows were shut off. Pressures slowly dropped off as the system was dried with hot nitrogen for an hour and a half.

The chloride baseline was 5000 ppm. At steady state, the effluent sodium and chloride concentrations were 32 and 97 ppm, respectively. These concentrations are about 25% in excess of the solubility product of NaCl at reactor conditions, implying that little NaCl was lost from the solid separator in particulate form. Effluent pH was about 2.7, so neutralization was not complete.

The solid collected at the top of the inclined tube was about 95% sodium chloride with the remainder largely sodium carbonate. The amount of sodium carbonate was larger at the bottom of the separator.

This run establishes the feasibility of forming sodium chloride in the supercritical water environment to the near exclusion of sodium carbonate.

Other techniques may be adopted which provide for neutralization or addition of a neutralizing agent before carbon dioxide formation. For example, an alternative procedure to prevent carbonate interference is to react the organic material initially with less oxygen than that necessary to convert the organics to carbon dioxide. Then the caustic or other neutralizing agent is added, after which the remaining oxygen is added to complete the oxidation. Of course, if reforming is the desired object, then the additional oxygen would not be used. This procedure is facilitated by the fact that the carbon-chlorine bond can be broken more easily than the carbon-carbon bond. Accordingly, the organic material can be reacted with up to half of the oxygen stoichiometrically equivalent to complete oxidation, which would produce substantial amounts of carbon monoxide, or with as little as about 10–25% or even 5–15% of that oxygen equivalent, for mild reforming.

These salt separation experiments were successful in showing that sodium chloride will form under the conditions of supercritical water oxidation, although carbonate interference must be dealt with. The crystals seem to agglomerate readily, and must be quite densely packed under process conditions.

In the foregoing runs the precipitated salts were permitted to accumulate in the separator (an inclined tube) and were then collected for analysis. An exit port for solids at the bottom of the separator can be used for removal purposes, as indicated by numerals 44 and 55 in FIGS. 6 and 7, respectively.

For continuous or semi-continuous removal of salts, a solids take-off leg can be attached to the bottom of a solids settling column or other solids separator devices. Embodiments of this are described below in connection with a cyclone separator for the first-stage of the solids/fluid separator.

Figure 8:
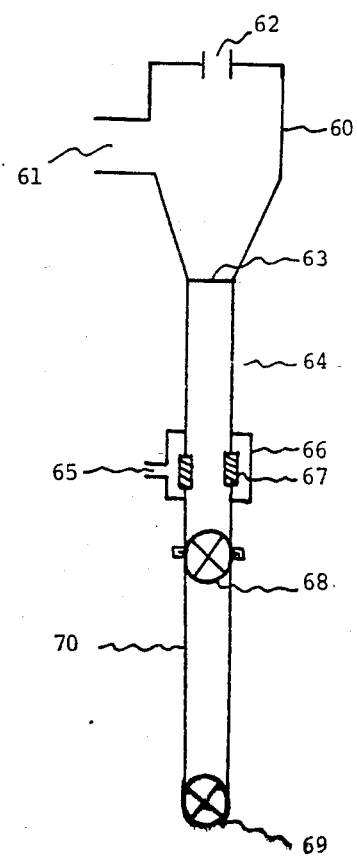

In FIG. 8, the effluent from a supercritical reactor (containing precipitated salts) enters a cyclone 60 at entrance port 61. The fluid entering the cyclone, which is operated in accordance with conventional separator principles, primarily exits through port 62. The solids material and entrained fluid pass downward through exits 63 into the solids take-off leg 64. A temperature gradient is established along the length of this leg, by any of several means. The top of the leg is at about the supercritical temperature of water or higher, preferably above 450° C., for example, 450° C. to 550° C., with a density for the entrained water of about 0.1 g/cm$^3$. At the bottom of the leg the density of the water would be at about 1 g/cm$^3$ with a temperature below the boiling point of water. The cooling along the length of the leg can be accomplished by conventional means, such as ambient exposure, a cooling coil wrapped around or in the leg or, as depicted, by injection of a cooling fluid. Pressurized air can be piped from inlet 65 into jacket 66, from which it seeps through frits 67 into the leg, through which it rises. The frits may be the porous elements made by Mott Metallurgical Corp., Farmington, Conn., with a pore size of about ½ to 20 microns.

The removal of the salts, which are in a concentrated solution or slurry at the bottom of the leg, can be accomplished with conventional equipment. In the system shown, valves 68 and 69 are cycled to provide a semi-continuous flow of the salts. With valve 68 open and valve 69 closed, the lower leg section 70 will fill with salt (solution or slurry). Then valve 68 is closed and valve 69 opened for removal of the salts. The removal of the salts is facilitated by the expansion of gaseous components entrained in the solids or dissolved in the liquid. Valve 69 is then closed and valve 68 opened to repeat the process. Alternatively, the product from leg 64 can be discharged in a gas/liquid separator, which is a vessel having an exit for gases in its upper portion and a discharge port for liquid and/or solids material in its bottom portion

EXAMPLE 11

Using 12% dinitrotoluene in methyl ethyl ketone as the feed material in a system as in Example 6, the process of the invention was carried out with oxygen as the oxidant in an excess of 21% at an average reactor wall temperature of 580° C. with a residence time of 1.2 minutes. The resulting carbon destruction efficiency was 99.9959, and the carbon combustion efficiency was greater than 99.99. The total effluent gas composition of the first run contained 0.35% $N_2$ and 0.52% $N_2O$ and of the second run contained 0.47% $N_2$ and 0.62% $N_2O$. The effluent gas of the third run contained 0.51% $N_2$ and 0.61% $N_2O$ and that of the fourth run contained 0.59 $N_2$, but no $N_2O$. No NO was found in the effluent gas of either Run A, Run B or Run D. The effluent gas of Run C contained 0.45% NO. The experiment was repeated at an average reactor wall temperature of 574° C. with an excess of oxygen of only 4.5%. The carbon destruction efficiency was 99.9992 and the combustion efficiency was still greater than 99.99.

Lowering the oxygen input to 1.7% less than the stoichiometric amount needed for complete oxidation, the experiment was then repeated at a temperature of 570° C. with the resulting carbon destruction efficiency of 99.6164 and combustion efficiency of 98.5128. From this it can be seen that the amount of oxygen needed to operate a system cleanly and efficiently is close to the stoichiometric amount needed for complete oxidation. Further lowering the oxygen input to 49.1% less than the stoichiometric amount needed for complete oxidation, another experiment was carried out at 577° C., with a residence time of 1.1 minutes, using a feed material of 10% dinitrotoluene in methyl ethyl ketone. The resulting carbon destruction efficiency was 73.2783 and the combustion efficiency was 46.2343. In this experiment about 77% of the carbon comes out in the gas phase compared to over 95% in the previous three runs. The makeup of the gas shifts from primarily $CO_2$ (i.e., where there is essentially complete oxidation), to a mixture of $CO_2$, CO and hydrocarbons containing up to six carbon atoms where there is partial oxidation or reforming.

The data for the respective runs is shown below in table 10:

TABLE 10

|  | Run 1 | Run 2 | Run 3 | Run 4 | Run 5 |
|---|---|---|---|---|---|
| Feed Material (% DNT in MEK) | 12 | 12 | 12 | 10 | 10 |
| Residence Time (min) | 1.2 | 1.2 | 1.2 | 1.1 | 1.1 |
| Temp. °C. | 580 | 574 | 570 | 479 | 577 |
| Excess $O_2$ (%) | 21.0 | 4.5 | −1.7 | −50.0 | −49.1 |
| Organic In (ppm) | 17612 | 17439 | 17439 | 17275 | 18360 |
| Organic Out (ppm) | 0.7 | 0.1 | 66.9 | 4462 | 4906 |
| Destruction Efficiency | 99.9959 | 99.9992 | 99.6164 | 74.1713 | 73.2783 |
| Combustion Efficient | 99.99 | 99.99 | 98.5128 | 43.5893 | 46.2343 |
| N in (ppm) | 513 | 508 | 508 | 409 | 435 |
| N as Nitrate (ppm) | 35 | 10 | 4 | — | — |
| N as Nitrite (ppm) | 20 | — | — | — | — |
| N Out Liquid (%) | 10.8 | 2.0 | 0.8 | — | — |
| N Out Gas (%) | 94.9 | 93.8 | 110.1 | 24.0 | 40.3 |
| N Balance (%) | 105.7 | 95.8 | 110.9 | 24.0 | 40.3 |
| Gas Composition (%) |  |  |  |  |  |
| $O_2$ | 23.26 | 6.89 | 0.53 | 0.14 | 0.04 |
| $CO_2$ | 75.75 | 93.83 | 98.30 | 45.91 | 50.96 |
| $CH_4$ | 0.00 | 0.00 | 0.00 | 10.20 | 10.23 |
| $H_2$ | 0.00 | 0.00 | 0.35 | 4.35 | 3.19 |
| CO | 0.00 | 0.00 | 1.48 | 39.67 | 33.46 |
| $N_2$ | 0.35 | 0.47 | 0.51 | 0.33 | 0.59 |
| $N_2O$ | 0.52 | 0.62 | 0.61 | 0.00 | 0.00 |
| NO | 0.00 | 0.00 | 0.45 | — | — |
| $C_2H_6$ | — | — | — | 0.57 | 1.27 |
| $C_2H_4$ | — | — | — | 3.70 | 5.87 |
| $C_3$ | — | — | — | 0.13 | 0.21 |
| $C_4$ | — | — | — | 0.03 | 0.10 |
| $C_5$ | — | — | — | 0.10 | 0.00 |
| $C_6$ | — | — | — | 0.00 | 0.04 |

The amount of oxygen used in the process of this invention is usually from about that which is stoichiometrically equivalent to complete oxidation up to about 25 to 50 or 75% excess—with amounts from about stoichiometric to about a 15% excess being preferred. However, as shown above, useful results are also achieved with amounts substantially less than stoichiometric. Runs 4 and 5 illustrate the reforming of an organic material to produce a product having fuel value.

The process of this invention can be used to reform organic materials by conducting the reforming reactions set forth in my U.S. Pat. No. 4,113,446 and in copending applications Ser. No. 328,812 and Ser. No. 328,813 filed on Dec. 9, 1981 with a modification of adding oxygen-containing fluid to the feed or directly into the reactor. The foregoing patent and copending applications are incorporated herein for further details on the reactants and reaction conditions. As noted, the modification thereto is the addition of an oxygen-containing fluid. For reforming, the amount of oxygen used is less than that needed to completely oxidize the organic material, i.e., from about 5 to 95% of the stoichiometric equivalent, or preferably from about 10 to 50%.

EXAMPLE 12

Using air as the oxidant rather than pure oxygen may be advantageous in some commercial applications. Several runs were conducted using air instead of oxygen, but with all other conditions about the same. The runs with air compared with their oxygen counterparts show similar high destruction efficiencies. Of course, the gas effluent is diluted several fold by nitrogen when air is used. These runs are summarized in Table 11.

TABLE 11

| Feed Material | MEK | | DCBP/MEK | | MEK | | DCBP/MEK | |
|---|---|---|---|---|---|---|---|---|
| Run | A | A' | B | B' | C | C' | D | D' |
| Oxidant | Air | $O_2$ | Air | $O_2$ | Air | $O_2$ | Air | $O_2$ |
| Temperature (°C.) | 519 | 505 | 510 | 501 | 456 | 453 | 456 | 462 |
| Residence Time | 1.4 | 1.4 | 1.4 | 1.4 | 1.4 | 1.4 | 1.4 | 1.5 |
| Excess $O_2$ (%) | 20.1 | 9.0 | 17.0 | 10.8 | 13.9 | 8.5 | 18.3 | 7.2 |
| Carbon Analysis | | | | | | | | |
| Organic In (ppm) | 9206 | 9093 | 9839 | 9260 | 9583 | 8849 | 9624 | 9814 |
| Organic Out (ppm) | 2.5 | .9 | 0.2 | 8.6 | 6.7 | 66.4 | 44.4 | 18.2 |
| Destruction Efficiency (%) | 99.97 | 99.99 | 99.998 | 99.91 | 99.93 | 99.25 | 99.54 | 99.81 |
| Combustion Efficiency (%) | 99.99 | 99.79 | 99.99 | 98.72 | 99.70 | 99.44 | 98.84 | 98.88 |
| Carbon Balance Closure (%) | 102.45 | 101.5 | 103.96 | 100.7 | 105.48 | 109.4 | 105.16 | 101.3 |
| Gas Composition | | | | | | | | |
| $O_2$ | 3.85 | 11.32 | 3.34 | 14.03 | 2.85 | 11.69 | 3.74 | 10.48 |
| $CO_2$ | 13.59 | 83.79 | 14.09 | 80.69 | 14.17 | 85.61 | 13.69 | 88.46 |
| $CH_4$ | 0.00 | .16 | 0.00 | .54 | 0.00 | 0.07 | 0.01 | 0.27 |
| $H_2$ | 0.04 | — | 0.04 | — | 0.05 | — | 0.04 | 0.06 |
| CO | 0.00 | 0.02 | 0.00 | .51 | 0.04 | 0.41 | 0.15 | 0.73 |
| $N_2$ | 73.31 | | 73.31 | | 73.30 | | 73.12 | | condition of water and a temperature of at least 374° C. to give a single phase reaction enabling essentially complete oxidation by a stoichiometric amount of oxygen. The pressure used in the continuous system of this invention is preferably always in the near critical region of water and thus always at least 220 atmospheres.

Although only a single organic material has been specifically noted in certain examples, it should be understood that the feed material can be a mixture of organics. In some cases, the mixture of organics can be unknown or undetermined as to its exact makeup. It is only important that a sufficient concentration of organics having the required heating value be used so that when reacted with stoichiometric amounts of oxygen, the effluent stream will have a temperature such as to produce some aid in providing the heat required for bringing the feed to appropriate conditions for the oxidizing reaction. It is an important feature of the invention that the heat produced by the oxidation can be used at least in part in a portion of an effluent stream to recycle directly with the reaction mixture to provide heat thereto and/or to be passed to a heat exchanger to provide heat to the reaction mixture through a heat exchange surface. When a portion of the effluent stream from the flow through oxidizer is recycled directly into the stream as at 17 substantially instantaneous heat While specific examples of this invention have been shown and described, many variations are possible. The reactor can have various configurations such as tubes, cylinders or fluidized beds of austenitic steel. When corrosive components such as chlorides are present, the tubular reactors preferably are clad with corrosion-resistant alloys such as Hastelloy C. Various compressors, eductors and the like can be used.

The power output can be effected using turbines commonly manufactured for expansion of supercritical water in supercritical power cycles.

A key feature is that a single fluid phase reaction occurs in the oxidizer at supercritical conditions of the reaction mixture and preferably at the near critical condition of water. In some cases, the oxidation can start at a temperature below the critical temperature of water as at the kindling temperature of the organic material. In all cases, the starting mixture and subsequent products are considered the reaction mixture. At some point in the reaction in the oxidizer, the mixture reaches the supercritical conditions and preferably the near critical transfer occurs. Simple eductors and other non-mechanical agitator mixing means and methods can be used. In some cases, the water and oxidation product stream from the oxidizer is used entirely as a power or heat source.

The term "single homogeneous fluid phase" as used herein has its ordinary known meaning with respect to the mixture of fluids present where the mixture is at uniform pressure, temperature, density and concentration. There is some change in all parameters except pressure in the reactor or oxidizer, however, at any cross section all parameters are substantially uniform in the single homogeneous fluid phase. Thus it is important that there is at least one portion of the reaction mixture in the oxidizer where there is no dispersion of one fluid in another.

What is claimed is:

1. The method of oxidizing an organic material in an oxidizer, which comprises:

forming a mixture of said organic material with water and a fluid comprising oxygen under conditions near supercritical including a pressure at least about 220 atmospheres, and at the inlet of said oxidizer, causing said mixture to undergo reaction under supercritical conditions for water, characterized by a temperature of at least about 400° C. and a pressure of at least about 220 atmospheres in said oxidizer.

2. The method of claim 1 wherein said temperature is at least about 500° C. and the destruction efficiency of said organic materials is at least about 99.9%.

3. The method of claim 1 wherein said temperature is at least about 600° C. and the destruction efficiency of said organic materials is at least about 99.99%.

4. The method of claims 2 or 3 wherein said organic material comprises chlorinated hydrocarbons.

5. The method of claim 1 wherein the conditions in said oxidizer are adapted to obtain a temperature of at least 450° C. in an effluent stream from said oxidizer and under said conditions removing inorganic salts as particulates therefrom.

6. The method of claim 5 wherein said inorganic salts are soluble in water below the supercritical conditions for water.

7. The method of claim 1 in which said conditions are characterized by a temperature of over about 450° C.

8. The method of claim 7 in which said organic material contains at least one element selected from the group consisting of chlorine, nitrogen, sulfur and phosphorous, and the resulting reaction products of said reaction include chloride ion or an oxy-anion of nitrogen, sulfur or phosphorous.

9. The method of claim 8 in which said reaction products are further reacted with a cation to form an inorganic salt.

10. The method of claim 9 in which said cation is selected from the group consisting of sodium, potassium, magnesium, iron and calcium.

11. The method of claim 7 wherein said organic material comprises at least one chlorinated hydrocarbon which is brought into contact with sodium hydroxide sufficient to provide at least an amount of sodium to form sodium chloride with the elemental chlorine in said hydrocarbon.

12. The method of claim 11 wherein said contact is prior to forming said mixture.

13. The method of claim 12 wherein a mixture is formed of said organic material and water, said sodium hydroxide is added thereto, and then a fluid comprising oxygen is added to said mixture.

14. The method of claim 1 in which said organic material comprises a nitrogen-containing compound.

15. The method of claim 14 in which said nitrogen-containing compound is urea.

16. The method of claims 14 or 15 wherein said conditions include a temperature of at least 550° C. to oxidize said nitrogen-containing compound to substantially nitrogen, carbon dioxide and water.

17. A method according to claim 1 wherein said mixture is formed using water at a temperature and pressure above about 377° C. and 220 atmospheres.

18. A method according to claim 17 wherein the water used has a temperature of at least about 400° C.

19. A method according to claim 17 wherein the water used has a temperature of at least about 500° C.

20. A method according to claim 17 wherein the water used has a temperature of at least about 600° C.

21. A method according to claim 1 wherein an aqueous liquid at supercritical conditions is mixed directly with said organic material and oxygen to quickly bring the mixture to supercritical conditions.

22. A method according to claim 21 wherein the mixture is formed at the inlet of said oxidizer and the temperature of the mixture substantially instantaneously reaches supercritical temperature.

23. A method according to claim 1 wherein the residence time of the mixture in the oxidizer is from about less than one minute to about 5 minutes.

24. A method according to claim 23 wherein the residence time is less than about one minute.

25. The method of oxidizing an organic material, which comprises:

forming a mixture of said organic material with water and a fluid comprising oxygen under conditions near supercritical including a pressure of at least about 220 atmospheres, at the inlet of said oxidizer, causing said mixture to undergo reaction under supercritical conditions for water, and conducting said reaction under conditions to provide an effluent stream at a temperature above about 450° C. to cause inorganics therein to precipitate.

26. The method of claim 25 in which said organic material contains at least one element selected from the group consisting of chlorine, nitrogen, sulfur and phosphorous, and the resulting reaction products of said reaction include chloride ion or an oxy-anion of nitrogen, sulfur or phosphorous.

27. The method of claim 26 wherein a compound containing a cation is added to said effluent to form an inorganic salt which precipitates therefrom.

28. The method of claim 27 wherein said cation is selected from the group consisting of sodium, potassium, magnesium, iron and calcium.

29. The method of claim 25 in which said organic material is a chlorinated hydrocarbon and sodium hydroxide is added thereto prior to oxidizing said organic material, wherein the amount of sodium hydroxide added is at least about equivalent to that needed to form a salt with the free chloride ions released from oxidizing said organic material.

30. The method of removing inorganics from oxidized organic materials which comprises providing for the precipitation of inorganic salts by contacting said oxidized materials with a fluid at a temperature of at least about 450° C. and a pressure of at least 220 atmospheres, and separating said inorganic salts therefrom.

31. The method of claim 30 wherein said oxidized organic materials contain the oxidation product of an organic material having at least one element selected from the group consisting of chlorine, nitrogen, sulfur and phosphorous.

32. The method of claim 30 wherein said oxidized organic materials contain chloride ions.

33. The method of claims 31 or 32 wherein said oxidized organic materials are treated with a cation to form an inorganic salt.

34. The process of claim 30 wherein said oxidized organic material is made from a process of forming a mixture of organic material, water and an oxygen-containing fluid under conditions near supercritical including a pressure of at least about 220 atmospheres, and at the inlet of the oxidizer causing said mixture to undergo reaction under supercritical conditions for water.

35. The method of claims 1 or 7 or 25 or 34 in which the step of forming said mixture comprises mixing together said organic material and water under supercritical conditions and adding thereto a fluid comprising oxygen.

36. The method or claims 1 or 7 or 25 or 34 wherein the amount of oxygen is at least about stoichiometrically equivalent to that which would completely oxidize said organic material.

37. The method of claims 1 or 7 or 25 or 34 wherein the amount of oxygen is less than the stoichiometrically equivalent to that which would completely oxidize said organic material.

* * * * *